Figure 1:
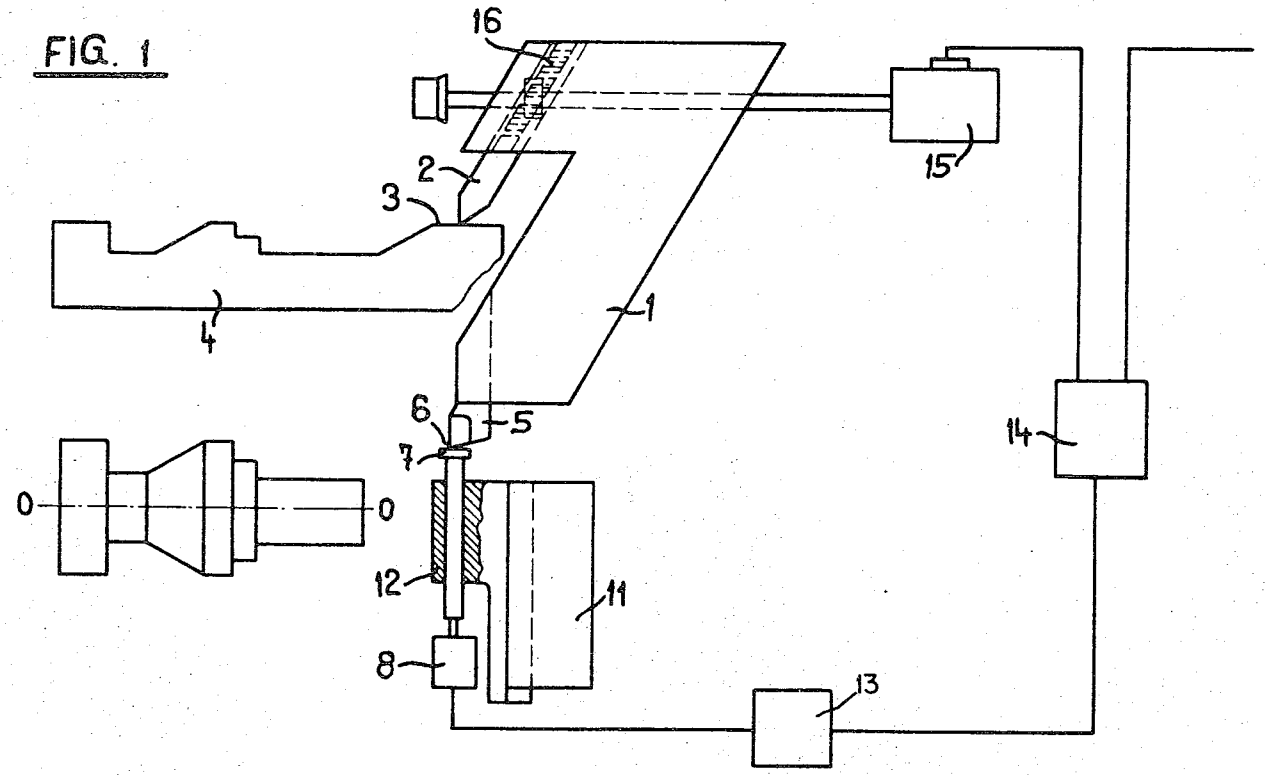
Figure 3:
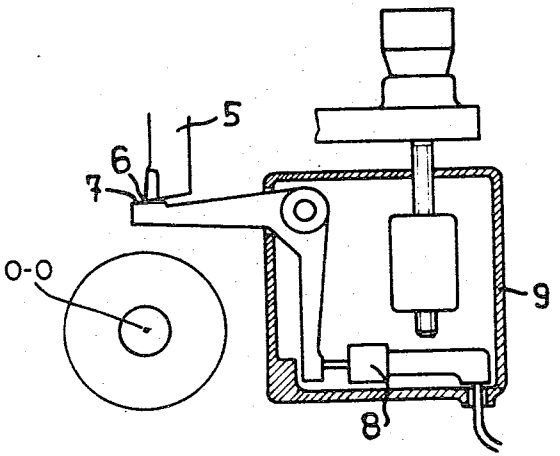
Figure 2:
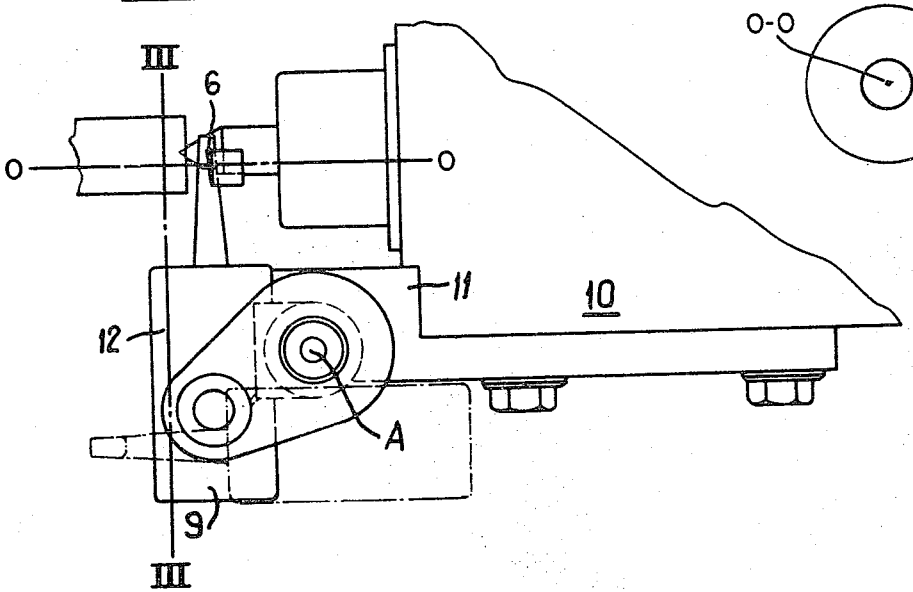

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUG. 1, 1972

901 O.G. 7

T901,004

DEVICE FOR POSITIONING A CUTTING EDGE OF A CUTTING TOOL ON A MACHINE TOOL

Ernest Schmid, Marin-Epagnier, Switzerland, assignor to Edouard Dubied & Cie Societe Anonyme Continuation of application Ser. No. 800,929, Feb. 20, 1969. This application Mar. 24, 1971, Ser. No. 127,804
Claims priority, application Switzerland, Feb. 28, 1968, 2,913/68
Int. Cl. B23b *3/28*
U.S. Cl. 82—14 D
2 Sheets Drawing. 6 Pages Specification

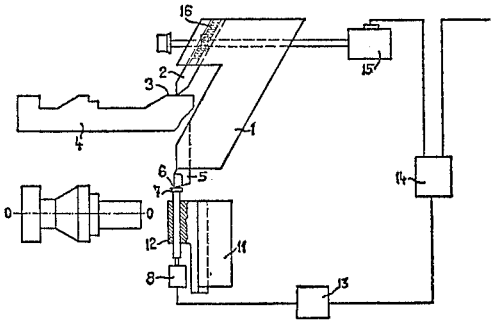

A positioning device is disclosed for positioning a cutting tool at a predetermined position relative to a reference template. The cutting tool is rigidly mounted on a tool slide which constitutes part of a copying lathe. A feeler is positioned to contact the reference template and is mounted on the tool slide for movement relative thereto in such a manner that both the tool slide and the cutting tool may be moved as a unit relative to the feeler. The positioning device comprises a movable sensor disposed in opposed, spaced-apart relationship to the cutting tool when the feeler is in contact with the reference template and a control circuit responsive to the movement of the sensor to effect movement of the tool slide. The control circuit comprises a switch actuated in response to movement of the sensor to provide an electric signal, a comparator for comparing the electrical signal with a reference signal indicative of the correct cutting tool position and providing a corresponding control signal, and a motor responsive to the control signal to effect movement of the tool slide thereby accurately positioning the cutting tool.

DEVICE FOR POSITIONING A CUTTING EDGE OF A CUTTING TOOL ON A MACHINE TOOL

Original Filed Feb. 20, 1969 2 Sheets-Sheet 1